(12) United States Patent
Wen et al.

(10) Patent No.: US 7,561,501 B2
(45) Date of Patent: Jul. 14, 2009

(54) SERVO CONTROL DEVICE, OPTICAL DISK DRIVE, AND SERVO CONTROL METHOD

(75) Inventors: Chih-Chung Wen, Shindian (TW); Yao-Hsin Wang, Shindian (TW)

(73) Assignee: VIA Technologies, Inc., Taipei (TW)

( * ) Notice: Subject to any disclaimer, the term of this patent is extended or adjusted under 35 U.S.C. 154(b) by 659 days.

(21) Appl. No.: 11/384,282

(22) Filed: Mar. 21, 2006

(65) Prior Publication Data

US 2007/0109927 A1    May 17, 2007

(30) Foreign Application Priority Data

Nov. 14, 2005    (TW) .............................. 94139957 A

(51) Int. Cl.
*G11B 7/00*    (2006.01)
(52) U.S. Cl. ............. 369/44.28; 369/44.34; 369/124.01
(58) Field of Classification Search ....................... None
See application file for complete search history.

(56) References Cited

U.S. PATENT DOCUMENTS 5,933,397 A * 8/1999 Yamashita et al. ....... 369/44.28
6,052,344 A * 4/2000 Ueki ....................... 369/44.27

* cited by examiner

*Primary Examiner*—Muhammad N. Edun
(74) *Attorney, Agent, or Firm*—Birch, Stewart, Kolasch & Birch, LLP

(57) ABSTRACT

A servo control device couples with an optical pickup head, which outputs a TEZC (tracking error zero crossing) signal. The servo control device includes a detection module, a signal generation module, and a selection module. In this case, the detection module detects emboss areas in an optical disk to output an emboss indication signal. The signal generation module generates a pseudo signal in accordance with the moving speed of the optical pickup head and the TEZC signal. The selection module generates a modified TEZC signal in accordance with the emboss indication signal, the pseudo signal and the TEZC signal. An optical disk drive including the servo control device and a servo control method thereof are also provided.

18 Claims, 4 Drawing Sheets

SERVO CONTROL DEVICE, OPTICAL DISK DRIVE, AND SERVO CONTROL METHOD

BACKGROUND OF THE INVENTION

1. Field of Invention

The invention relates to an optical disk drive and, in particular, to a servo control device for an optical disk drive and a servo control method thereof.

2. Related Art

With the advent of the information, video and audio age, the optical information storage technology has been widely used. When data is being accessed using this technology, a storage medium, such as an optical disk, and an optical disk drive for accessing the optical disk have to be utilized.

The optical disks that are often seen in the current market include a CD-ROM (Compact Disk Read Only Memory), a CD-R (Compact Disk Recordable), a CD-RW (Compact Disk Rewritable), a DVD-ROM (Digital Versatile Disk Read Only Memory), a DVD-RW/DVD+RW (Digital Versatile Disk Rewritable) and a DVD-RAM (Digital Versatile Disk Random Access Memory).

Among the conventional optical disks, the DVD-RAM is formed with a plurality of data tracks for recording data. FIG. 1 is a schematic illustration showing first to third data tracks 11 to 13 of a conventional DVD-RAM. Each data track includes several sectors to store the data, and a header Hd is disposed at a front end of each sector. The area formed by these headers Hd is referred to as an emboss area 20, which has a reflectivity higher than those of other areas of the optical disk.

Next, a TEZC (Tracking Error Zero Crossing) signal is usually utilized to perform a track seeking process in the conventional optical disk. In general, the TEZC signal has regular square waves, as shown in FIG. 2. The number of the square waves represents the number of data tracks of the optical disk crossed by the optical pickup head. For example, the TEZC signal from time t1 to t2 represents that the optical pickup head crosses two data tracks of the optical disk. The prior art utilizes the TEZC signal as the seeking signal, and the optical disk drive can obtain the number of data tracks of the optical disk crossed by the optical pickup head according to the seeking signal so as to control the moving speed of the optical pickup head.

However, when the optical pickup head moves to the emboss area 20 of the optical disk, a seeking error signal (TE signal) tends to have a glitch because the reflectivity of the emboss area 20 is much higher than the other areas of the optical disk. Thus, the corresponding TEZC signal in the emboss area 20 is affected by the TE signal and forms a plurality of square waves having a smaller frequency, as shown from time t3 to t4. In other words, the prior art utilizing the TEZC signal as the seeking signal tends to cause the seeking error, particularly in the emboss areas in DVD-RAM disk.

Therefore, it is important to provide a servo control device and a servo control method thereof for an optical disk drive capable of modifying the TEZC signal as a correct seeking signal.

SUMMARY OF THE INVENTION

In view of the foregoing, the present invention is to provide a servo control device and a servo control method thereof for an optical disk drive capable of modifying a TEZC signal into a correct seeking signal.

A servo control device of the invention is coupled with an optical pickup head, which outputs a TEZC (Tracking Error Zero Crossing) signal. The servo control device includes a detection module, a signal generation module and a selection module. The detection module detects emboss areas in an optical disk to output an emboss indication signal. The signal generation module generates a pseudo signal according to a moving speed of the optical pickup head and the TEZC signal. The selection module generates a modified TEZC signal according to the emboss indication signal, the pseudo signal and the TEZC signal.

In addition, the invention also discloses an optical disk drive including an optical pickup head, a sled motor and a servo control device. The optical pickup head outputs a TEZC (Tracking Error Zero Crossing) signal. The sled motor carries the optical pickup head. The servo control device includes a detection module, a signal generation module and a selection module. The detection module detects emboss areas in an optical disk to output an emboss indication signal. The signal generation module generates a pseudo signal according to a moving speed of the optical pickup head and the TEZC signal. The selection module generates a modified TEZC signal according to the emboss indication signal, the pseudo signal and the TEZC signal so as to control the sled motor to move the optical pickup head according to the modified TEZC signal and to perform a track seeking process.

The invention also provides a servo control method applied to an optical disk drive, which has an optical pickup head. The servo control method includes the steps of: receiving a TEZC (Tracking Error Zero Crossing) signal; generating a pseudo signal according to a moving speed of the optical pickup head and the TEZC signal; detecting emboss areas in an optical disk to output an emboss indication signal; and generating a modified TEZC signal according to the emboss indication signal, the pseudo signal and the TEZC signal.

As mentioned above, the servo control device and the servo control method for the optical disk drive of the invention generate the modified TEZC signal according to the emboss indication signal, the pseudo signal and the TEZC signal, so that the modified TEZC signal can serve as the correct seeking signal. Accordingly, the waste of the seeking time caused by the conventionally incorrect seeking signal can be avoided.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
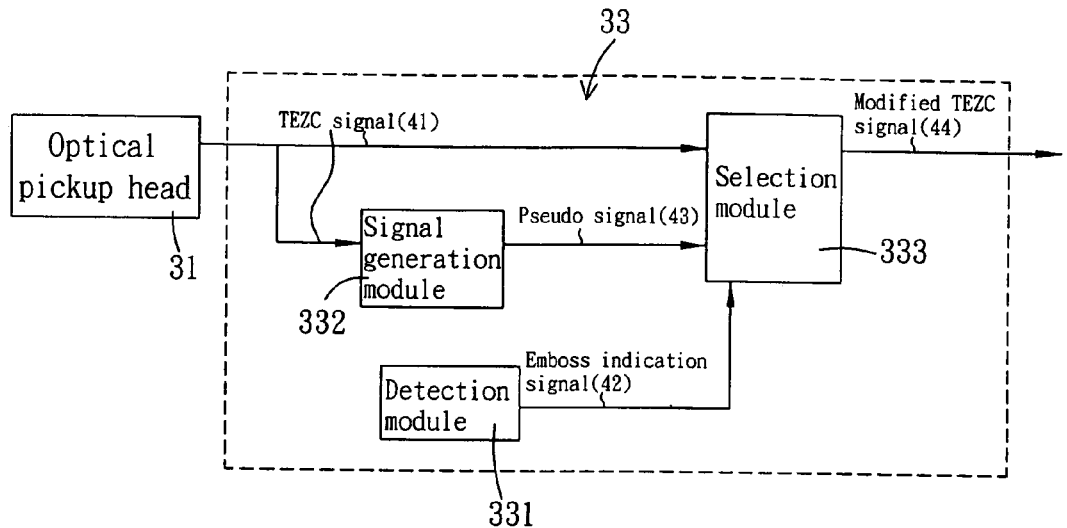
FIG. 3 is a schematic illustration showing a servo control device according to an embodiment of the invention.

With reference to FIG. 3, a servo control device 33 according to an embodiment of the invention is coupled with an optical pickup head 31. The optical pickup head 31 outputs a TEZC signal (tracking error zero crossing signal, TEZC signal) 41. The servo control device 33 includes a detection module 331, a signal generation module 332 and a selection module 333.

In this embodiment, the detection module 331 detects emboss areas 20 to output an emboss indication signal 42 to the selection module 333. The signal generation module 332 receives the TEZC signal 41 and generates a pseudo signal 43 according to a moving speed of the optical pickup head 31 and the TEZC signal 41. The pseudo signal 43 is then outputted to the selection module 333. The selection module 333 generates a modified TEZC signal 44 according to the emboss indication signal 42, the pseudo signal 43 and the TEZC signal 41. The modified TEZC signal 44 is used as a TEZC signal that has been modified. In addition, the moving speed of the optical pickup head 31 in this embodiment may be detected in a track seeking process.

Figure 4:
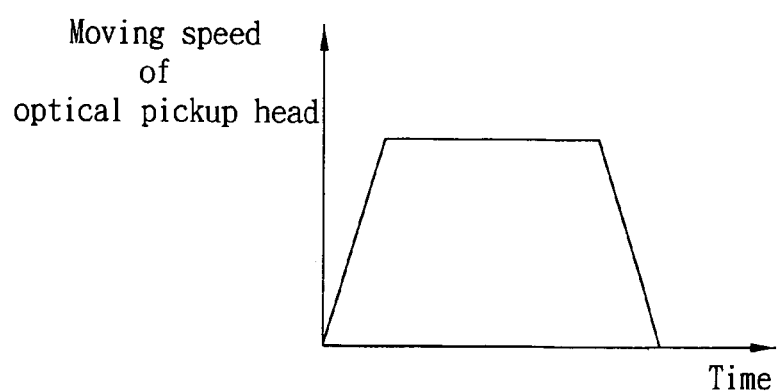
FIG. 4 is a schematic illustration showing a moving speed of an optical pickup head.

Furthermore, the signal generation module 332 of this embodiment generates the pseudo signal 43, by way of calculation or looking up a look-up-table, according to the moving speed of the optical pickup head 31 and the TEZC signal 41. For example, the moving speed of the optical pickup head 31 in a track seeking process may be represented by the profile of FIG. 4, which includes several stages of stopping, accelerating, holding a constant speed, and then decelerating to stop. Thus, it is possible to calculate a period for the optical pickup head 31 to cross a track according to the equation of the profile, such that the pseudo signal 43 is generated. In addition, it is also possible to design a seeking speed reference table (not shown) in advance, and then to look up the seeking speed reference table according to the moving speed of the optical pickup head 31. Thus, the period for the optical pickup head 31 to cross one track may be obtained, and the pseudo signal 43 may be generated.

Figure 1:
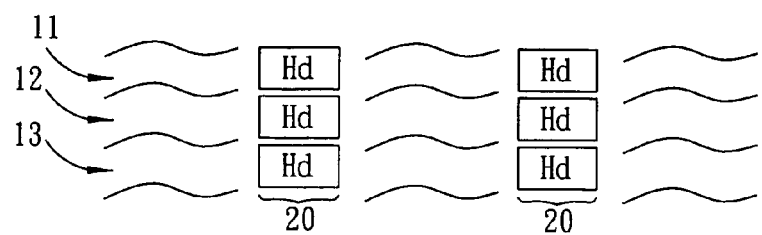
FIG. 1 is a schematic illustration showing a part of data tracks of the conventional DVD-RAM.
Figure 2:
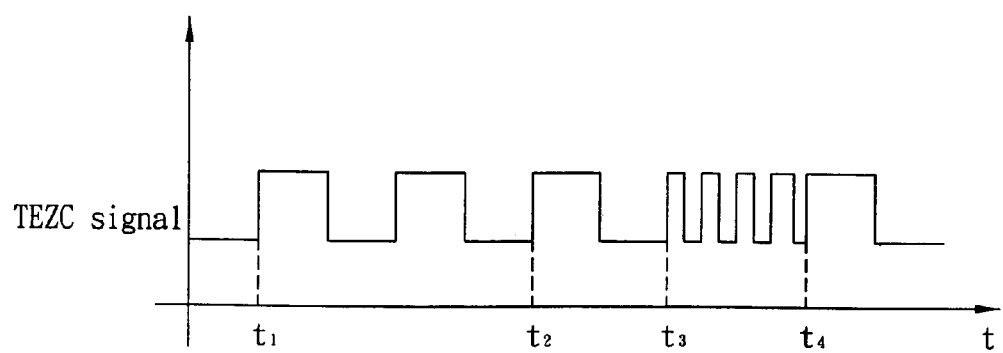
FIG. 2 shows a waveform diagram of conventional TEZC signal.
Figure 5:
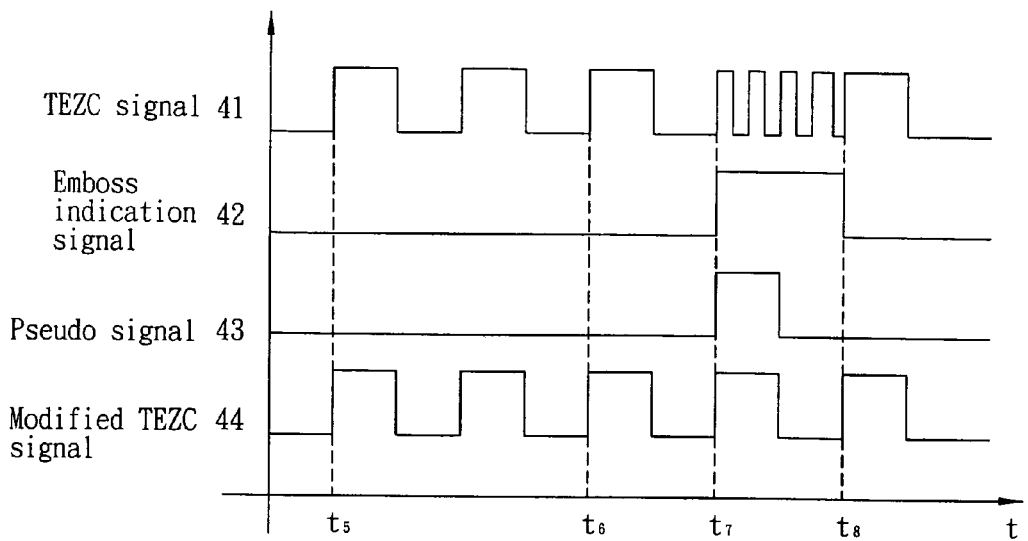
FIG. 5 is a timing chart showing various signals in the servo control device according to the embodiment of the invention.

As shown in FIGS. 1, 3 and 5, when the optical pickup head 31 corresponds to the emboss area 20 between, for example, time t7 and t8, the detection module 331 detects the emboss area 20 to output the emboss indication signal 42 with a first level (high level). On the contrary, when the optical pickup head 31 does not correspond to the emboss area 20 between, for example, time t5 and t6, the detection module 331 outputs the emboss indication signal 42 with a second level (low level).

In addition, when the selection module 333 receives the emboss indication signal 42 with the first level, the selection module 333 generates the modified TEZC signal 44 according to the pseudo signal 43. When the selection module 333 receives the emboss indication signal 42 with the second level, the selection module 333 generates the modified TEZC signal 44 according to the TEZC signal 41. For example, the emboss indication signal 42 has the second level (low level) between time t5 and t7 in FIG. 5. Thus, the selection module 333 generates the modified TEZC signal 44 according to the TEZC signal 41. Because the TEZC signal 41 has the regular square waves and the number of square waves of the TEZC signal 41 may correctly represent the number of data tracks of the optical disk crossed by the optical pickup head, the modified TEZC signal 44 also has the regular square waves between time t5 and t7 and the number of square waves of the modified TEZC signal 44 may also represent the number of data tracks of the optical disk crossed by the optical pickup head. The emboss indication signal 42 has the first level (high level) between time t7 and t8. Thus, the selection module 333 generates the modified TEZC signal 44 according to the pseudo signal 43. Because the pseudo signal 43 has the regular square waves and the number of square waves of the pseudo signal 43 can correctly represent the number of data tracks of the optical disk crossed by the optical pickup head, the modified TEZC signal 44 may also have regular square waves between time t7 and t8 and the number of square waves of the modified TEZC signal 44 may also represent the number of data tracks of the optical disk crossed by the optical pickup head. Thus, the modified TEZC signal 44 may serve as the correct seeking signal.

In this embodiment, the functions of the detection module 331, the signal generation module 332 and the selection module 333 may be implemented using a digital integrated circuit. For example, the detection module 331 may be a comparator, the signal generation module 332 may be a clock generation circuit, and the selection module 333 may be a multiplexer.

As mentioned above, the servo control device 33. may be applied to an optical disk drive to prevent the optical disk drive from the waste of the seeking time caused by the conventionally incorrect seeking signal. An example will be illustrated to explain an optical disk drive according to an embodiment of the invention.

Figure 6:
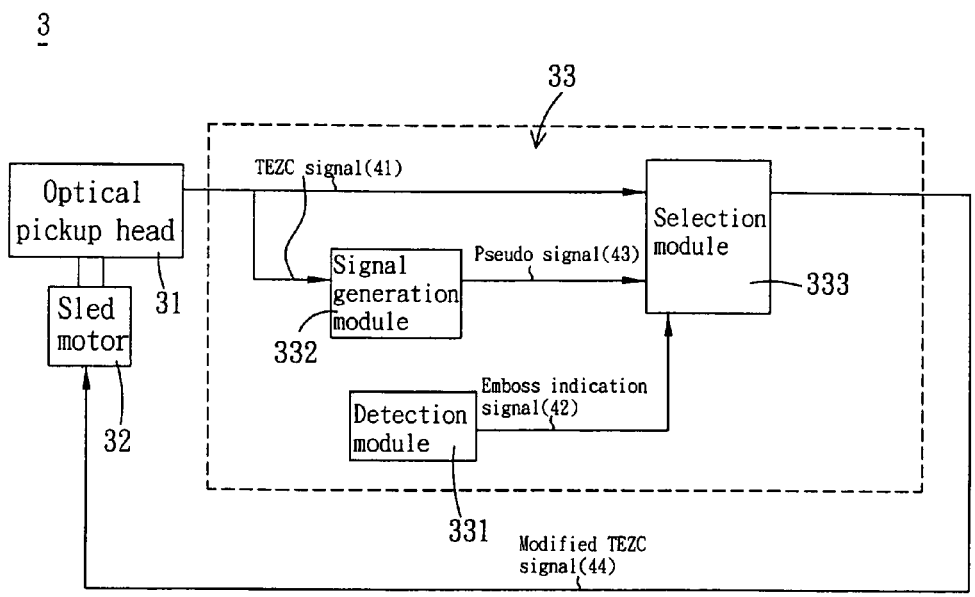
FIG. 6 is a schematic illustration showing an optical disk drive according to an embodiment of the invention.

Referring to FIG. 6, an optical disk drive 3 according to the embodiment of the invention includes an optical pickup head 31, a sled motor 32 and a servo control device 33.

In this embodiment, the optical pickup head 31 outputs a TEZC signal 41 to the servo control device 33, the sled motor 32 carries the optical pickup head 31 to move, and the servo control device 33 includes a detection module 331, a signal generation module 332 and a selection module 333. The main architecture of the servo control device 33 has been described previously, and the detailed descriptions thereof will be omitted.

Furthermore, the servo control device 33 of this embodiment outputs a modified TEZC signal 44 to the sled motor 32 so as to control the sled motor 32 to move the optical pickup head 31 to perform a track seeking process according to the modified TEZC signal 44.

In order to make the invention clearer, a servo control method used in an optical disk drive according to a preferred embodiment of the invention will be illustrated, wherein the method can prevent the optical disk drive from wasting the seeking time, which is caused by the conventionally incorrect seeking signal.

Figure 7:
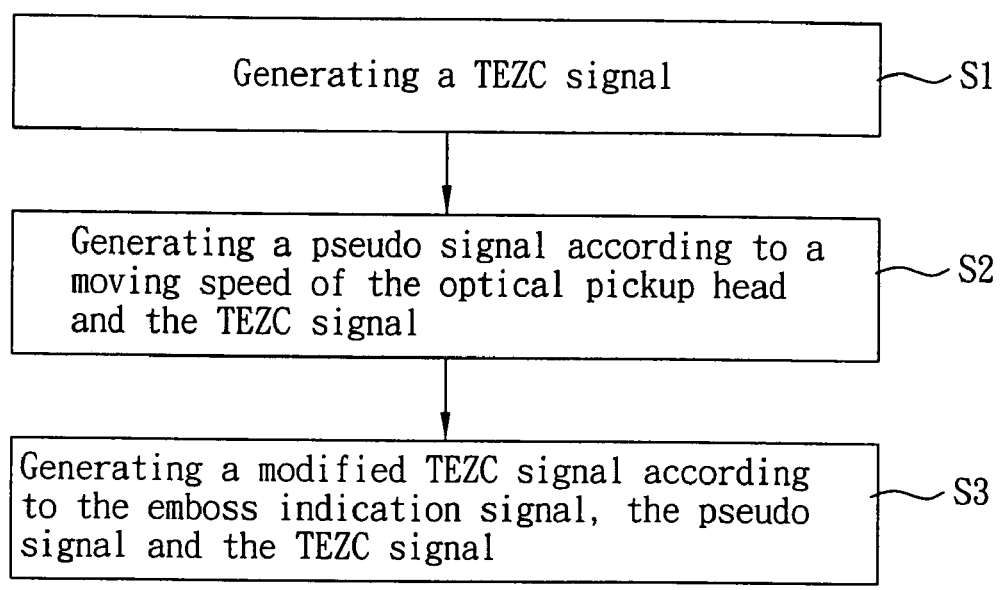
FIG. 7 is a flow chart showing a servo control method according to a preferred embodiment of the invention.

Referring to FIG. 7, a servo control method according to the preferred embodiment of the invention used in an optical disk drive, which has an optical pickup head, includes the following steps S1 to S3.

In step S1, receiving a TEZC signal.

In step S2, generating a pseudo signal according to a moving speed of the optical pickup head and the TEZC signal. When the optical pickup head corresponds to an emboss area, outputting an emboss indication signal with a first level. In addition, when the optical pickup head does not correspond to the emboss area, outputting an emboss indication signal with a second level. The moving speed of the optical pickup head may be detected in a track seeking process.

In step S3, generating a modified TEZC signal according to the emboss indication signal, the pseudo signal and the TEZC signal. When the emboss indication signal with the first level is received, generating a modified TEZC signal according to the pseudo signal. In addition, when the emboss indication signal with the second level is received, generating a modified TEZC signal according to the TEZC signal, and the pseudo signal may be generated, by way of calculation or looking up a look-up-table, according to the moving speed of the optical pickup head and the TEZC signal.

In summary, the servo control device and the servo control method for the optical disk drive of the invention generate the modified TEZC signal according to the emboss indication signal, the pseudo signal and the TEZC signal, so that the modified TEZC signal can serve as the correct seeking signal. Accordingly, the waste of the seeking time caused by the conventionally incorrect seeking signal can be avoided.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A servo control device coupled with an optical pickup head, wherein the optical pickup head outputs a TEZC (Tracking Error Zero Crossing) signal, the servo control device comprising:
   a detection module detecting emboss areas in an optical disk to output an emboss indication signal;
   a signal generation module generating a pseudo signal according to a moving speed of the optical pickup head and the TEZC signal; and
   a selection module generating a modified TEZC signal according to the emboss indication signal, the pseudo signal and the TEZC signal.

2. The servo control device according to claim 1, wherein:
   when the detection module detects the emboss areas, the detection module outputs the emboss indication signal with a first level, or the detection module outputs the emboss indication signal with a second level.

3. The servo control device according to claim 2, wherein when the selection module receives the emboss indication signal with the first level, the selection module generates the modified TEZC signal according to the pseudo signal; and
   when the selection module receives the emboss indication signal with the second level, the selection module generates the modified TEZC signal according to the TEZC signal.

4. The servo control device according to claim 1, wherein the signal generation module generates the pseudo signal by way of calculation or looking up a look-up-table according to the moving speed of the optical pickup head and the TEZC signal.

5. The servo control device according to claim 1, wherein the moving speed of the optical pickup head is detected in a track seeking process.

6. The servo control device according to claim 1, wherein the optical disk is a DVD-RAM (Digital Versatile Disk Random Access Memory).

7. An optical disk drive, comprising:
   an optical pickup head outputting a TEZC (Tracking Error Zero Crossing) signal;
   a sled motor carrying the optical pickup head; and
   a servo control device comprising:
      a detection module detecting emboss areas in an optical disk to output an emboss indication signal,
      a signal generation module generating a pseudo signal according to a moving speed of the optical pickup head and the TEZC signal, and
      a selection module generating a modified TEZC signal according to the emboss indication signal, the pseudo signal and the TEZC signal so as to control the sled motor to move the optical pickup head according to the modified TEZC signal and to perform a track seeking process.

8. The optical disk drive according to claim 7, wherein:
   when the detection module detects the emboss areas, the detection module outputs the emboss indication signal with a first level, or the detection module outputs the emboss indication signal with a second level.

9. The optical disk drive according to claim 8, wherein when the selection module receives the emboss indication signal with the first level, the selection module generates the modified TEZC signal according to the pseudo signal; and
   when the selection module receives the emboss indication signal with the second level, the selection module generates the modified TEZC signal according to the TEZC signal.

10. The optical disk drive according to claim 7, wherein the signal generation module generates the pseudo signal by way of calculation or looking up a look-up-table according to the moving speed of the optical pickup head and the TEZC signal.

11. The optical disk drive according to claim 7, wherein the moving speed of the optical pickup head is detected in a track seeking process.

12. The optical disk drive according to claim 7, wherein the optical disk is a DVD-RAM (Digital Versatile Disk Random Access Memory).

13. A servo control method applied to an optical disk drive, wherein the optical disk drive has an optical pickup head, the servo control method comprising the steps of:
   receiving a TEZC (Tracking Error Zero Crossing) signal;
   generating a pseudo signal according to a moving speed of the optical pickup head and the TEZC signal;
   detecting emboss areas in an optical disk to output an emboss indication signal; and
   generating a modified TEZC signal according to the emboss indication signal, the pseudo signal and the TEZC signal.

14. The servo control method according to claim 13, wherein:
   outputting the emboss indication signal with a first level when the emboss areas is detected; or
   outputting the emboss indication signal with a second level.

15. The servo control method according to claim 14, wherein
   when outputting the emboss indication signal with the first level, generating the modified TEZC signal according to the pseudo signal; and
   when outputting the emboss indication signal with the second level, generating the modified TEZC signal according to the TEZC signal.

16. The servo control method according to claim 13, wherein the pseudo signal is generated by way of calculation or looking up a look-up-table according to the moving speed of the optical pickup head and the TEZC signal.

17. The servo control method according to claim 13, wherein the moving speed of the optical pickup head is detected in a track seeking process.

18. The servo control method according to claim 13, wherein the optical disk is a DVD-RAM (Digital Versatile Disk Random Access Memory).

* * * * *